United States Patent
Magee et al.

(10) Patent No.: US 7,165,455 B2
(45) Date of Patent: Jan. 23, 2007

(54) SURFACE ACOUSTIC WAVE SENSOR METHODS AND SYSTEMS

(75) Inventors: Steven J. Magee, Lena, IL (US); James D. Cook, Freeport, IL (US); James Z. Liu, Rockford, IL (US)

(73) Assignee: Honeywell International Inc., Morristown, NJ (US)

( * ) Notice: Subject to any disclaimer, the term of this patent is extended or adjusted under 35 U.S.C. 154(b) by 137 days.

(21) Appl. No.: 11/017,171

(22) Filed: Dec. 18, 2004

(65) Prior Publication Data

US 2006/0130585 A1    Jun. 22, 2006

(51) Int. Cl.
*H03H 9/25* (2006.01)

(52) U.S. Cl. .................... 73/650; 73/778; 73/862.042; 310/313 R; 310/313 B

(58) Field of Classification Search ............ 310/313 R, 310/313 B
See application file for complete search history.

(56) References Cited

U.S. PATENT DOCUMENTS

| | | | | |
|---|---|---|---|---|
| 4,100,811 A | * | 7/1978 | Cullen et al. ................. | 73/654 |
| 4,216,401 A | | 8/1980 | Wagner .................. | 310/313 R |
| 4,326,423 A | | 4/1982 | Hartemann | |
| 4,361,026 A | * | 11/1982 | Muller et al. ............... | 73/24.01 |
| 4,454,440 A | | 6/1984 | Cullen .................... | 310/313 R |
| 5,189,914 A | * | 3/1993 | White et al. .................. | 73/599 |
| 5,471,723 A | | 12/1995 | Luder et al. ................ | 29/25.41 |
| 5,821,425 A | | 10/1998 | Mariani et al. ............... | 73/703 |
| 6,079,276 A | | 6/2000 | Frick et al. .................... | 73/718 |
| 6,300,706 B1 | * | 10/2001 | Grudkowski et al. ........ | 310/334 |
| 6,327,590 B1 | * | 12/2001 | Chidlovskii et al. ............ | 707/5 |
| 6,374,678 B1 | | 4/2002 | Masuda ........................ | 73/706 |
| 6,484,585 B1 | | 11/2002 | Sittler et al. .................. | 73/718 |
| 6,541,893 B1 | | 4/2003 | Zhu et al. .................... | 310/313 |
| 6,550,337 B1 | | 4/2003 | Wagner et al. ................ | 73/715 |
| 6,571,638 B1 | | 6/2003 | Hines et al. .................. | 73/702 |
| 2004/0216526 A1 | | 11/2004 | Cook et al. | |

FOREIGN PATENT DOCUMENTS

| | | |
|---|---|---|
| DE | 10054198 A1 | 9/2001 |
| WO | WO 03/034013 A1 | 4/2003 |
| WO | WO 03/081195 A1 | 10/2003 |

OTHER PUBLICATIONS

Benes et al., Piezoelekrische Resonatoren als Sensorlemente, Elektrotechnik Und Informationstechnik, Springer Verlag, Wien, At, vol. 122, No. 9, Sep. 1995, pp. 471-483.

(Continued)

*Primary Examiner*—Hezron Williams
*Assistant Examiner*—Rose M. Miller
(74) *Attorney, Agent, or Firm*—Kermit D. Lopez; William B. Shelby

(57) ABSTRACT

Sensor systems and methods are disclosed herein, including a sensor chip, upon which at least two surface acoustic wave (SAW) sensing elements are centrally located on a first side (e.g., front side) of the sensor chip. The SAW sensing elements occupy a common area on the first side of the sensor chip. An etched diaphragm is located centrally on the second side (i.e., back side) of the sensor chip opposite the first side in association with the two SAW sensing elements in order to concentrate the mechanical strain of the sensor system or sensor device in the etched diagram, thereby providing high strength, high sensitivity and ease of manufacturing thereof.

23 Claims, 3 Drawing Sheets

OTHER PUBLICATIONS

Buff et al., Universal Pressure and Temperature Saw Sensor for Wireless Applications, 1997 Ultrasonics Symposium, 1997 IEEE Tronto, Ont., Canada Oct. 5-8, 1997, p. 359-362.

Bulst et al., State of the Art in Wireless Sensing with Surface Acoustic Waves, Industrial Electronics Society, 1998. IECON 1998, vol. 4, Aug. 31, 1998, pp. 2391-2396.

* cited by examiner

SURFACE ACOUSTIC WAVE SENSOR METHODS AND SYSTEMS

TECHNICAL FIELD

Embodiments are generally related to sensing methods and systems. Embodiments are also related to micromachined sensing devices. Embodiments are additionally related to surface acoustic wave (SAW) devices and sensors. Embodiments are additionally related to torque, pressure and/or temperature sensors.

BACKGROUND OF THE INVENTION

Surface acoustic wave sensors can be utilized in a variety of sensing applications, such as torque, pressure and/or temperature detection. Such sensors can be implemented, for example, by locating surface acoustic wave (SAW) device on an etched diaphragm within a piezoelectric material such as quartz. To date, however, technological hurdles have prevented such devices from being effectively implemented. Currently, a strong demand exists to utilize torque, pressure and/or temperature sensors in harsh environments or in association with rotating parts.

Attempts have been made to implement pressure sensing devices. A number of problems, however, are associated with conventional sensor applications. For example, in a SAW sensor, mechanical strain affects both the propagation path length and wave velocity. Changes in frequency and/or phase thus correlate with this strain. In conventional, SAW torque sensor designs, for example, one or two SAW chips have been implemented in a torque sensor configuration. The use of such devices, however, results in increased production costs, larger chip sizes and is difficult to micromachine. Existing designs therefore require large substrate and circuit sizes, and also expensive calibration processes during production.

A need therefore exists for improved SAW sensor applications, particularly those involving torque, pressure and/or temperature sensing. It is believed that a micromachined approach, as disclosed herein, can overcome the aforementioned problems inherent with conventional sensing systems.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved sensor-based system and methods.

It is another aspect of the present invention to provide for improved SAW sensor-based system and methods.

It is yet a further aspect of the present invention to provide for improved quartz SAW sensor-based system and methods.

The aforementioned aspects of the invention and other objectives and advantages can now be achieved as described herein. Sensor systems and methods are disclosed herein, including a sensor chip, upon which at least two surface acoustic wave (SAW) sensing elements are centrally located on a first side (e.g., front side) of the sensor chip. The SAW sensing elements occupy a common area on the first side of the sensor chip. An etched diaphragm is located centrally on the second side (i.e., back side) of the sensor chip opposite the first side in association with the two SAW sensing elements in order to concentrate the mechanical strain of the sensor system or sensor device in the etched diagram, thereby providing high strength, high sensitivity and ease of manufacturing thereof.

The sensor chip can be configured from swept quartz, while the SAW sensing elements are composed of interdigital transducers (IDTs). The sensor chip can be arranged in a delay line configuration or a resonator configuration, depending upon design considerations. The diaphragm can be etched utilizing a wet or dry etchant, or mechanical etching methods. Note that changes in frequency, phase or amplitude associated with the sensor chip correlate with the mechanical strain.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
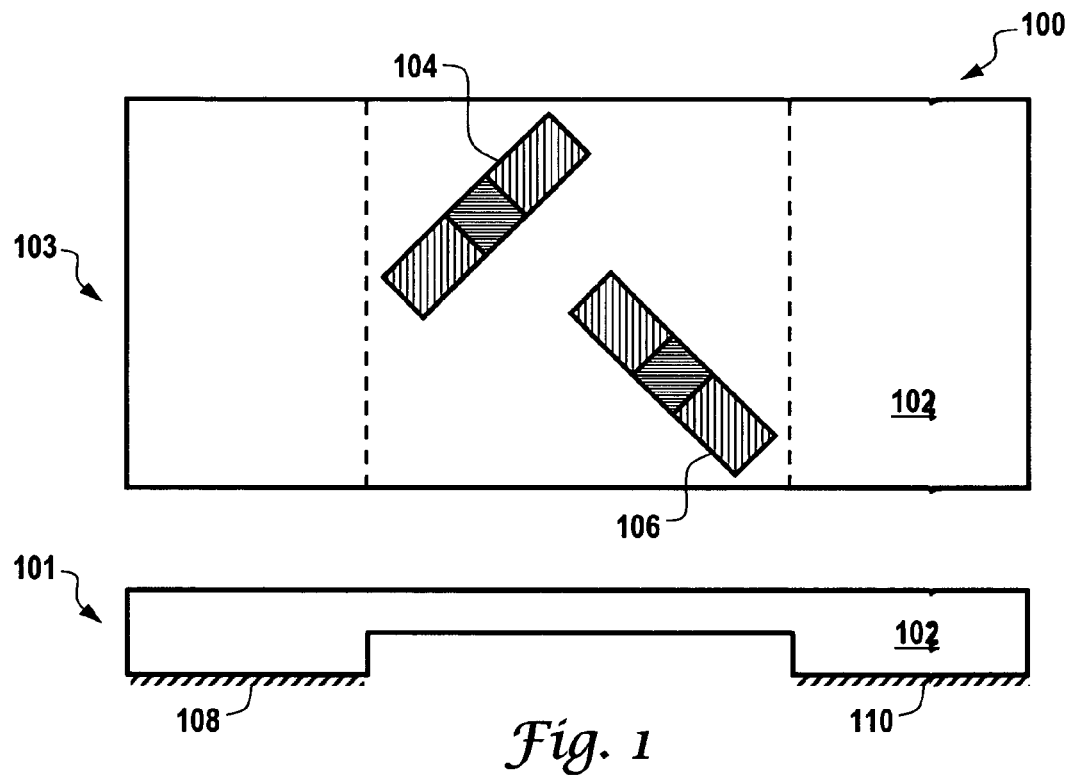
FIG. 1 illustrates a block diagram of a SAW torque sensor system 100, which can be implemented in accordance with a preferred embodiment.

The particular values and configurations discussed in these non-limiting examples can be varied and are cited merely to illustrate embodiments of the present invention and are not intended to limit the scope of the invention.

Embodiments disclosed herein generally describe a methodology for the mechanical design of an etched quartz diaphragm for torque, pressure and/or temperature sensing, along with general techniques for deep quartz etching, direct quart-to-quartz packaging, and metal connections, which protrude external to a quartz cage. Such concepts can be applied to sensing configurations based on an implementation of a plurality of SAW resonators.

The two SAW resonators or SAW delay lines can be at least partially on a sensing diaphragm. The SAW resonators or SAW delay lines should be located perpendicular to each other to form the half bridge for the torque strain measurement.

Prior to the design and fabrication of a wireless and/or passive quartz-based SAW sensor for torque, pressure and/or temperature measurement, a mechanical simulation of strain regimes on the diaphragms should be performed, in order to ensure that a reliable and elastic behavior of the quartz SAW sensor can be performed during an entire range of torque, pressure and/or temperature operations.

Depending upon the torque range to be measured, the quartz diaphragm deflecting under torque can be configured either from a thinner quartz wafer (i.e., without any etched regions) supported at the edges by another quartz wafer utilized for packaging and over torque stops, or by selectively etching the quartz in order to obtain an etched quartz torque sensing diaphragm. A quartz diaphragm performed by wet, dry or mechanical quartz etching can be configured for smaller torque measurements.

In general, increasing the frequency of SAW sensor operations can determine a strong reduction of dimensions of SAW devices, while the frequency bandwidth restrictions for preserving operations in the license-free frequency band can be easily fulfilled. The standard technology of SAW filters can also be applied for defining the interdigital transduced (IDT) domain. Because the direct quartz bonding technology requires a very flat surface, the use of metal ion implantation as a method for creating a conductive path inside an all-quartz package to outside bonding pads is preferred. Titanium represents one type of a preferred metal, the energy and dose of titanium implantation being determined by the designed electrical resistivity of the conductive path, as required by the adaptation circuit to sensor antenna.

The selection of materials for packaging and the encapsulation of SAW devices can have a tremendous effect on temperature dependence characteristics, long-term stability, hysteresis and creep, because any thermal stress at the surface of the quartz substrate where the SAW device is located can change the operation frequency. Packaging of SAW sensors is therefore a critical process. In order to avoid thermal stresses due to thermal expansion coefficient mismatch, a true all-quartz packaging (TAQP) technique can be implemented, in the context of a direct quartz-to-quartz wafer bonding process as follows:

1. Micro-roughness evaluation of as-received quartz wafers (AFM:RMS<1.3 nm);
2. Micro-roughness evaluation of processed quartz cover (wafer level) and quartz SAW substrate (wafer level) (AFM:RMS<1.3 nm);
3. Hydrophilisation treatment of quartz cover and quartz SAW substrate in boiled, concentrated $HNO_3$ for 30–50 minutes (i.e., generally, the RMS decreases after this treatment);
4. Rinsing in D1 water followed by drying;
5. Cleaning in Megasonic RCA 1 solution ($NH_4OH:H_2O_2$: $H_2O$=1:1:5) for 10 minutes, followed by $HCl:H_2O_2$: $H_2O$=1:1:6 for 10 minutes;
6. Drying of both quartz cover and quartz SAW substrate;
7. Immediate contact and alignment of cover and SAW substrate;
8. Thermal annealing in $N_2$ for 1 hour at a temperature T<450° C. (i.e., temperature should be ramped up and down at approximately 10° C./min); and
9. Bonding control, wherein the "crack opening" method is utilized by means of a 50 nm thin blade.

In the case of high-torque measurements, for an assumed quartz strength value of 50 MPa, it is generally not necessary to utilize an etched quartz diaphragm. In such a situation, the "starting" quartz wafer can be utilized as a whole such that diaphragm based sensing principles are implemented in the context of TAQP processes for moderate and low torque operations.

FIG. 1 illustrates a block diagram of a SAW torque sensor system 100, which can be implemented in accordance with a preferred embodiment. Note that in FIG. 1, a side view 101 and a top view 103 illustrate varying views of system 100. In general, system 100 includes a quartz sensor substrate 102 upon which an X-SAW resonator 104 and a Y-SAW resonator 106 are located. The X and Y SAW resonators 104 and 106 are positioned upon substrate 102 such that they possess opposite signal polarities. Such an arrangement permits system 100 to measure the magnitude of compressive and tensile strain. The direction and magnitude of torque can therefore be readily measured utilizing system 100. Note that in side view 101 bonding locations 108 and 110 are illustrated proximate to substrate 102.

Figure 2:
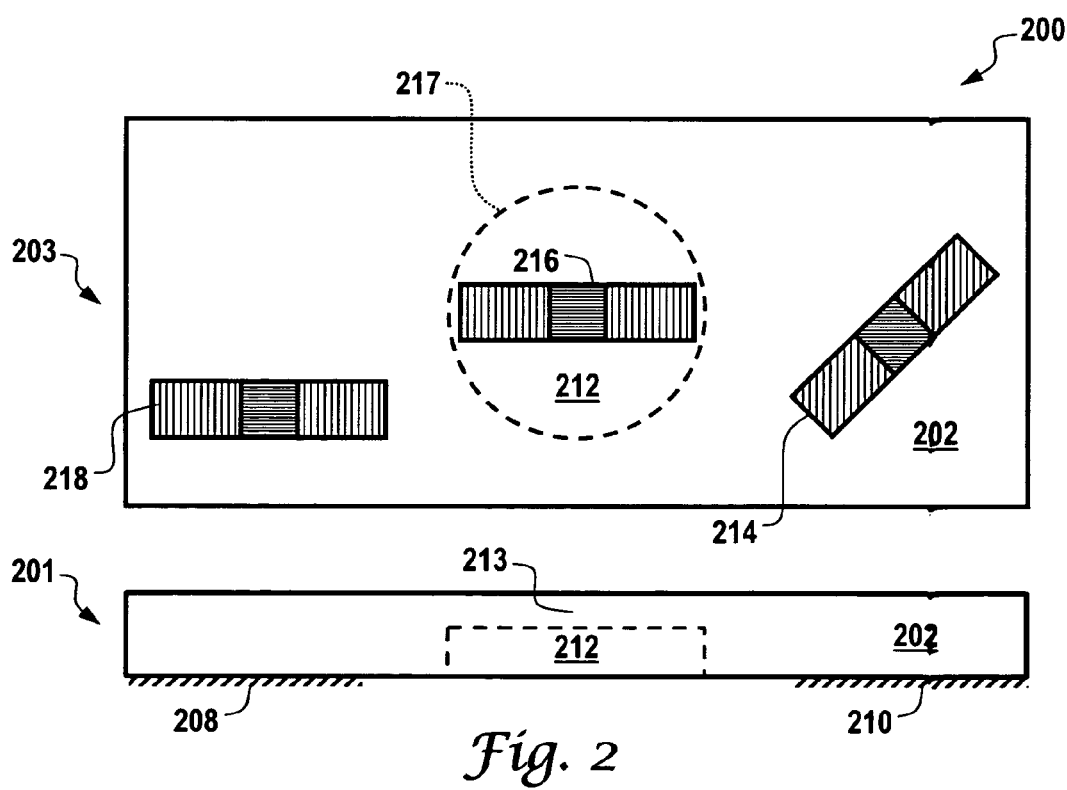
FIG. 2 illustrates a block diagram of a SAW torque sensor system, which can be implemented in accordance with an alternative embodiment.

FIG. 2 illustrates a block diagram of a SAW torque sensor system 200, which can be implemented in accordance with an alternative embodiment. System 200 depicts a side view 201 and a top view 203 of system 200. In general, a substrate 202 can be provided in association with bonding locations 208 and 210. A micro-machined cavity 212 can be configured from substrate 202. Additionally a reference SAW resonator 218 and a temperature SAW resonator 214 can be configured on or from substrate 202. Additionally, a torque SAW resonator 216 can be configured on substrate 202 within an area 217 located above cavity 212.

The torque SAW resonator 216 is positioned over a thin section 213 in substrate 202 so that the torque signal is maximized due to increased strain in region 213. The temperature SAW resonator 214 is positioned such that it is only influenced by temperature. The reference SAW resonator 218 is positioned on substrate 202 such that it is not influenced by torque and can be utilized as a reference resonator for temperature. The temperature information is required to obtain an increased accurate torque or pressure reading. In configurations without dedicated temperature sensors (e.g., see FIGS. 4 and 5, the temperature information can be obtained by utilizing a half bridge configuration, one under compressive strain and the other under tensile strain. The two frequencies produced could then be mixed together to produce the difference or the sum. The difference would be torque, and the sum would be temperature.

Figure 3A:
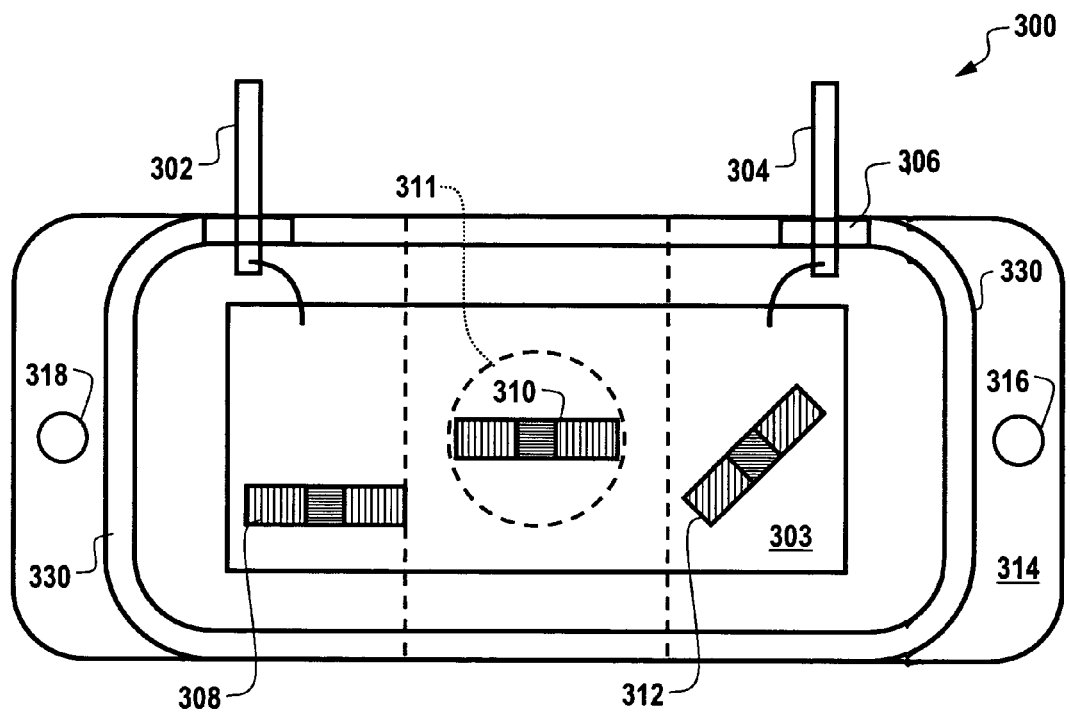
FIG. 3A illustrates a top view of a SAW torque sensor packaging system, which can be implemented in accordance with one embodiment.
Figure 3B:
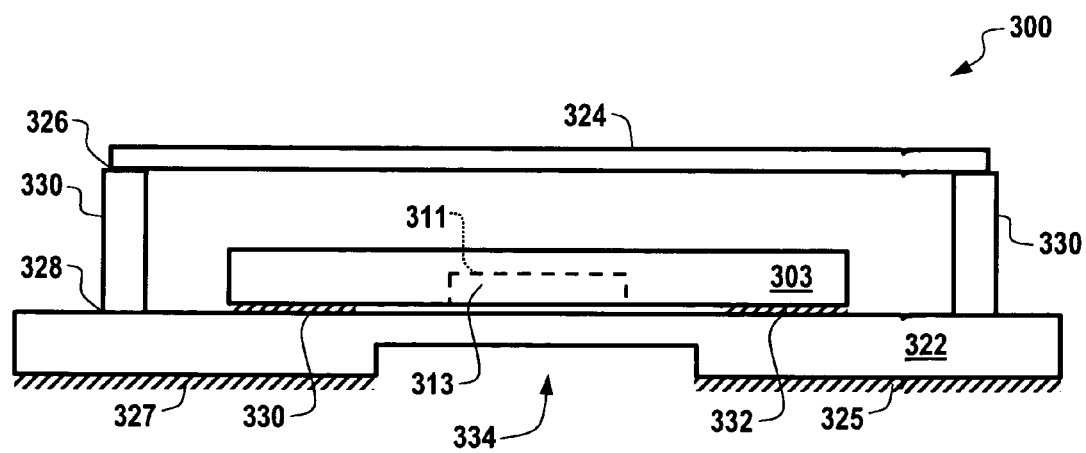
FIG. 3B illustrates a side view of the system of FIG. 3A, in accordance with an embodiment.

FIG. 3A illustrates a top view of a SAW torque sensor packaging system 300, which can be implemented in accordance with one embodiment. Similarly, FIG. 3B illustrates a side view of system 300, in accordance with an embodiment. System 300 generally includes a reference SAW resonator 308 and a temperature SAW resonator 312 located upon a SAW substrate 303. A torque SAW resonator 310 can be located on substrate 303 in a manner similar to that described above with respect to the configuration of FIG. 2. A antenna contact or output pin 302 and pin 304 protrude from system 300 through wall 330 that surrounds resonators 308, 310, and 312.

A cavity 334 can be configured from a package base 322 and serves as a strain concentrator. A weld and/or adhesive 325 and 327 can be configured around a mounting flange (not shown in FIGS. 3A-3B). Hermetic seals 326 and 328 can also be provided at packaging wall 330 and cover 324. A similar packaging wall 330 is also implemented in association with cover 324. SAW substrate 303 is also configured to include a cavity 313 which is located below a thin region 311 of substrate 303. Additionally, bonding locations 330 and 332 are located below substrate 303 in order to secure substrate 303 to base 322.

The package of system 300 is designed to maximize the strain in the torque SAW resonator 310 by utilizing cavities 313 and 334 respectively located in the SAW sensor substrate 303 and the package base 302. Such a package or system 300 can be formed utilizing a high strength stainless steel (e.g., 17-7 PH, Hastalloy, EN56, etc) for the base 322 and a more flexible stainless steel for the package wall formed from wall 330. A glass-to-metal seal (GTMS) 306 can also be formed from the into the flexible stainless steel material forming the package wall 330. Such a GTMS can be positioned in a lower strain area so that GTMS reliability is maintained.

In general, for the SAW devices described herein to be used for torque measurements, a number of processing steps can be utilized for SAW quartz wafer fabrication. An example of such processing steps is provided below:
1. Micro-roughness evaluation of as-received double-side chemical-polished quartz SAW wafers;
2. Wafer cleaning;
3. Deposition of thin metal layer used as resist mask in next step;
4. Photolithographic process for channel-gap forming, required for metal path to pass from SAW surface to external connection(s);
5. RIE etching of channel-gap;
6. Metal removal;
7. Wafer cleaning;
8. Deposition of the thin film layer utilized as a resist mask for titanium implantation;
9. Photolithographic process for titanium implantation;
10. Titanium implantation for buried conductive paths forming;
11. Deposition of the metal layer used for SAW electrode forming and external contact;
12. Photolithographic process for metal patterning;
13. Metal etching;
14. Wafer cleaning;
15. Hydrophilisation treatment of the quartz SAW wafer in boiled, concentrated $HNO_3$ for 30–50 minutes;
16. Rinsing in D1 water followed by drying;
17. Cleaning in Megasonic RCA 1 solution ($NH_4OH:H_2O_2$: $H_2O$=1:1:5) for 10 minutes, followed by $HCl:H_2O_2$: $H_2O$=1:1:6 for 10 minutes; and
18. Drying.

Upon completion of the processing steps indicated above, a similar set of processing steps can be implemented upon another quartz wafer to form the quartz base plate. When the two quartz wafers are ready for direct bonding, wafer dicing and chip assembling can be processed, as indicated below:
1. Contact and alignment of the quartz SAW wafer and quartz base plate;
2. Thermal annealing in $N_2$ for 1 hour at T<450° C., wherein the temperature should be ramped up and down with approximately 10° C./min;
3. Bonding control, wherein a "crack opening" method is utilized via a 50 mm blade;;
4. Partial wafer dicing (i.e., a cut of thickness equal to the thickness of the quartz SAW wafer, and only in one direction);
5. Entire thickness dicing of the bonded wafers on the inter-chip spaces of the AQP microstructure;
6. Chip bonding with special resin on the package base plate;
7. Dispensing of the conductive resin for metal contacting from both chips;
8. Wire bonding;
9. Dispensing of the protective resin; and
10. Capping and welding.

In a similar manner, the technology for other fabrication solutions of AQP SAW sensors can be described. The quartz wafer could be etched, for example, by wet, dry or mechanical etching. In an "all-quartz" sensor package, the electrode connections to the antenna could be performed via "through the wafer" connections. In the "through the wafer" design, the "through" holes could be drilled by laser, ultrasound, or wet etching.

In SAW sensors, mechanical strain affects both the propagation path length and wave velocity. Changes in frequency and/or phase correlate with the strain. The configurations of FIGS. 2–4 therefore illustrate varying embodiments in which the mechanical strain is concentrated in a single component, such as a diaphragm, in order to promote increased sensor sensitivity, while providing for ease of manufacturing and permitting designers more choices in the selection of diaphragm diameters.

Figure 4:
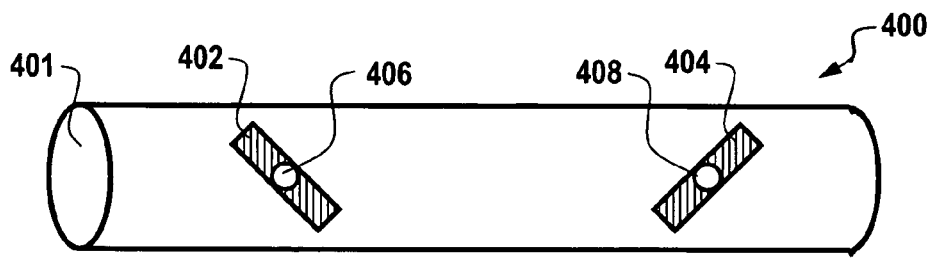
FIG. 4 illustrates a block diagram of an etched torque sensor system, which can be implemented in accordance with a preferred embodiment.

FIG. 4 illustrates a block diagram of a SAW sensor system 400 which can be implemented in accordance with one embodiment. System 400 generally includes a shaft 401 upon which two SAW chips 402 and 404 are located. SAW chip 402 includes a diaphragm 406, which is etched on the backside of SAW chip 402. Similarly, SAW chip 404 includes a diaphragm 408, which is etched on the back side of SAW chip 402. Etching is performed from the backside of SAW chips 402 and 404 in order to provide higher chip strength and concentrate the mechanical strain of such chips in the etched diaphragm 408.

Figure 5:
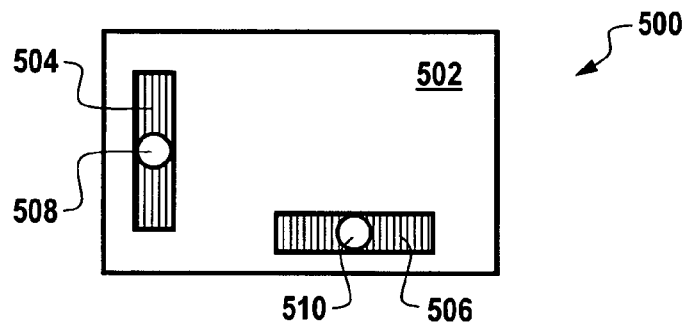
FIG. 5 illustrates a block diagram of a SAW sensor system, which can be implemented in accordance with another embodiment.

FIG. 5 illustrates a block diagram of a SAW sensor system 500, which can be implemented in accordance with another embodiment. System 500 generally includes two SAW sensors 504 and 506. A diaphragm 508 is etched on the back side of SAW sensor 504, while a diaphragm 510 is etched on the back side of SAW sensor 506. Both SAW chips 504 and 506 are located within same substrate 502.

Figure 6:
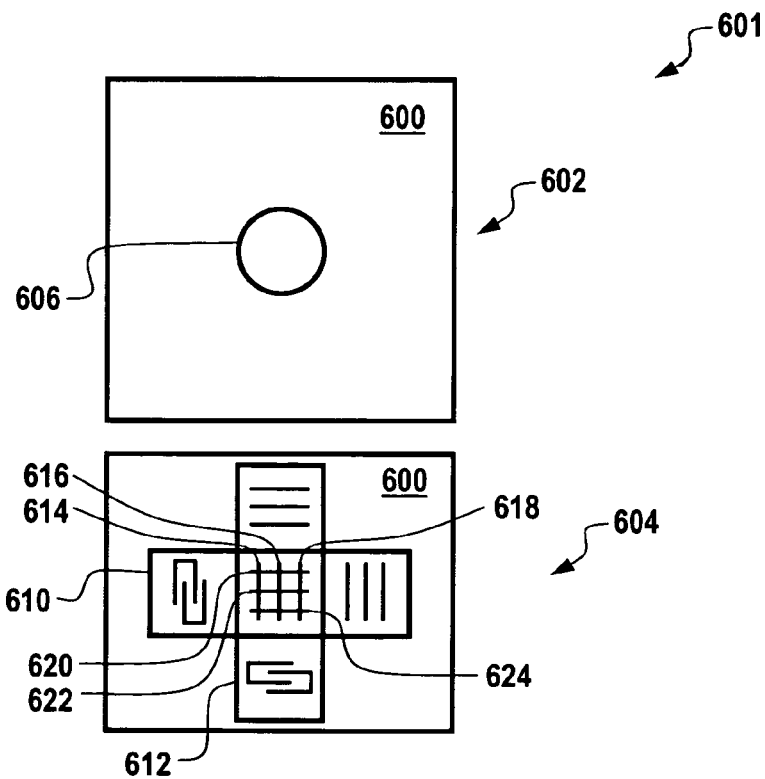
FIG. 6 illustrates a block diagram of an etched sensor system, which can be implemented in accordance with a preferred embodiment.

FIG. 6 illustrates a block diagram of an etched sensor system 601, which can be implemented in accordance with a preferred embodiment. System 601 generally includes a sensor chip 600, upon which at least two surface acoustic wave (SAW) sensing elements 610 and 612 are centrally located on a first side (e.g., front side) of the sensor chip 600. The SAW sensing elements 610, 612 occupy a common area on the first side of the sensor chip. An etched diaphragm 606 is located centrally on the second side (i.e., back side) of the sensor chip 600 opposite the two SAW sensing elements 610, 608 in order to concentrate the mechanical strain of the sensor system 601 or sensor device in the etched diagram 606, thereby providing high strength, high sensitivity and ease of manufacturing thereof.

The sensor chip 600 can be configured from swept quartz, while the SAW sensing elements 610, 612 are composed of interdigital transducers (IDTs). The sensor chip 600 can be arranged in a delay line configuration or a resonator configuration, depending upon design considerations. The diaphragm 606 can be etched utilizing a wet, dry, or mechanical etching. Note that changes in frequency or phase associated with the sensor chip 600 correlate with the mechanical strain. A plurality of reflectors can be provided, such that, for example, reflectors 614, 616, 618 are associated with SAW sensing element 610. Similarly, reflectors 620, 622, 624 are associated with SAW sensing element 612.

Thus, the IDT of the SAW chip (e.g., delay line or resonator) is located on one side of SAW chip 600, while etching is accomplished from the other side of the chip 600. The etchant utilized can be dry or wet, depending upon manufacturing requirements. Swept quartz is preferred due to the increased mechanical strength and better etched surface features. System 600 can be utilized as a torque sensor.

It can be appreciated that various other alternatives, modifications, variations, improvements, equivalents, or substantial equivalents of the teachings herein that, for example, are or may be presently unforeseen, unappreciated, or subsequently arrived at by applicants or others are also intended to be encompassed by the claims and amendments thereto.

What is claimed is:

1. A sensor method, comprising the steps of:
   providing a substrate comprising swept quartz;
   locating at least two surface acoustic wave (SAW) sensing elements located centrally on a first side of said substrate, wherein said at least two SAW sensing elements occupy a common area on said first side of said substrate and wherein said at least two SAW sensing elements comprise interdigital transducers thereof; and
   etching a cavity centrally on a second side of said substrate opposite said first side in association with said at least two SAW sensing elements, wherein said etched cavity forms an etched diaphragm on and from said substrate in order to concentrate a mechanical strain in said etched diagram, thereby providing a high strength, high sensitivity sensor system with ease of manufacturing thereof.

2. The method of claim 1 further comprising the step of arranging said at least two SAW sensing elements in a delay line configuration.

3. The method of claim 1 further comprising the step of arranging said at least two SAW sensing elements in a resonator configuration.

4. The method of claim 1 further comprising the step of etching said cavity on said second side of said sensor chip utilizing a wet etchant.

5. The method of claim 1 further comprising the step of etching said cavity on said second side of said sensor chip utilizing a dry etchant.

6. The method of claim 1 further comprising the step of mechanically etching said cavity on said second side of said sensor chip.

7. The method of claim 1 further comprising the steps of:
   configuring said at least two SAW sensing elements to comprise a first SAW sensor and a second SAW sensor,
   associating a first set of reflectors with said first SAW sensor and a second set of reflectors with said second SAW sensor on said first side of said sensor chip; and
   configuring said first and said second set of reflectors upon said etched diaphragm.

8. A sensor system, comprising:
   a quartz substrate;
   an etched cavity formed on a first side of said substrate, wherein said etched cavity forms an etched diaphragm on and from said substrate in order to concentrate a mechanical strain in said etched diaphragm;
   a plurality of surface acoustic wave (SAW) sensing elements located on a second side of said substrate opposite said first side, wherein a first SAW sensing element of said plurality of SAW sensing elements is located on said etched diaphragm, thereby combining a high strength, high sensitivity sensor system with ease of manufacturing.

9. The system of claim 8 further comprising:
   a second SAW sensing element of said plurality of SAW sensing elements, wherein said second SAW resonator is not influenced by torque; and
   a third SAW sensing element of said plurality of SAW sensing elements wherein said third sensing element is Influenced only by temperature.

10. The system of claim 9, further comprising:
    a package base bonded to said substrate;
    a second etched cavity formed on said package base on the side opposite to said substrate in order to maximize said mechanical strain in said etched diaphragm on said substrate;
    a wall formed upon said package base, wherein said wall surrounds said substrate, said etched diaphragm, and said plurality of said SAW sensing elements; and
    a cover bonded to said wall, wherein said wall and said cover enclose and seal said substrate, said etched diaphragm, and said plurality of said SAW sensing elements upon said package base.

11. The system of claim 10, wherein said etched cavity is etched utilizing an etching method selected from the group consisting of wet etching, dry etching and mechanical etching.

12. The system of claim 8, wherein a second SAW sensing element of said plurality of SAW sensing elements is located upon said etched diaphragm, wherein the signal polarity of said first SAW sensing element is opposite the signal polarity of said second SAW sensing element.

13. The system of claim 8, further comprising:
    a second SAW sensing element of said plurality of sensing elements, wherein said first and said second SAW sensing elements are centrally located and, wherein said first and said second SAW sensing elements occupy a common area upon said etched diaphragm; and
    a first set of a plurality of reflectors associated with said first SAW sensing element and a second set of a plurality of reflectors associated with said second SAW sensing element.

14. The system of claim 13, wherein said first and second SAW sensing elements are arranged in a delay line configuration.

15. The system of claim 13, wherein said first and said second SAW sensing elements are arranged in a resonator configuration.

16. The system of claim 13, wherein said etched cavity is etched in said substrate by an etching method selected form the group consisting of wet etching and dry etching.

17. A sensor system, comprising:
    a substrate;
    a plurality of surface acoustic wave (SAW) sensing elements located upon said substrate wherein each SAW sensing element of said plurality of SAW sensing elements has a first side and a second side; and
    an etched cavity formed on a first side of said each SAW sensing element, wherein said etched cavity forms an etched diaphragm on said each SAW element in order to concentrate a mechanical strain in said etched diaphragm, thereby combining a high strength, high sensitivity sensor system with ease of manufacturing.

18. The system of claim 17 wherein said substrate is formed as a shaft, and wherein said plurality of SAW sensing elements are configured in a half-bridge configuration.

19. The system of claim 17 wherein said plurality of SAW sensing elements is configured In a half-bridge configuration.

20. The system of claim 19 wherein a first SAW sensing element of said plurality of SAW sensing elements is under a compressive strain and a second SAW sensing element of said plurality of SAW sensing elements is under a tensile strain.

21. The system of claim 20 wherein at least one frequency from said first SAW sensing element and at least one frequency from second SAW sensing elements are mixed to produce a difference and a sum.

22. The system of claim 21 wherein said difference is utilized for torque sensing.

23. The system of claim 22 wherein said sum is utilized for temperature sensing.

* * * * *